(12) United States Patent
Held et al.

(10) Patent No.: US 12,716,823 B2
(45) Date of Patent: Aug. 25, 2026

(54) AUTOMATED INTERFRAME ALIGNMENT MONITORING FOR SHEET MANUFACTURING APPLICATIONS

(71) Applicant: Honeywell International Inc., Charlotte, NC (US)

(72) Inventors: Michael Leo Held, Stevens Point, WI (US); Michael Forbes, North Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 171 days.

(21) Appl. No.: 18/385,311

(22) Filed: Oct. 30, 2023

(65) Prior Publication Data

US 2024/0426725 A1 Dec. 26, 2024

Related U.S. Application Data

(60) Provisional application No. 63/522,252, filed on Jun. 21, 2023.

(51) Int. Cl.
*D21F 7/00* (2006.01)
*G01N 5/00* (2006.01)

(52) U.S. Cl.
CPC .................................... *G01N 5/00* (2013.01)

(58) Field of Classification Search
CPC .......... G01N 5/00; G01N 21/89; G01N 21/86; G01N 2021/8609; D21F 9/00; D21F 7/00; D21F 7/02; D21G 9/0009; D21G 9/0027; G01B 11/06; G01B 21/00; G01B 21/20; G01B 11/26; G01B 2210/58; H01M 4/04; H01M 10/04; H01M 10/0525; G05B 19/41875; B65H 9/20; G06F 17/10; H04N 1/00018; H04N 1/00034; H04N 1/00042;

(Continued)

(56) References Cited

U.S. PATENT DOCUMENTS 5,400,258 A 3/1995 He
6,086,237 A * 7/2000 Gorinevsky ......... G05B 13/042 700/134

(Continued)

FOREIGN PATENT DOCUMENTS

JP 2020076715 A * 5/2020 ............ G01B 21/08

*Primary Examiner* — Robert R Raevis
(74) *Attorney, Agent, or Firm* — Seager, Tufte & Wickhem, LLP

(57) ABSTRACT

Profile alignment with cross-correlation is employed to determine the alignment between two measured profiles taken at different locations along a sheet of material. Aligning two profiles in sheet manufacturing is critical so that the coating weight on the sheet can be calculated. Coat weight profile is calculated by subtracting the weight of the sheet prior to coating from the measured total weight of the coated sheet after coating. When profiles are not aligned correctly for this subtraction, the coat weight profile will be inaccurate and corrective control actions for apparent deviations in coat weight may be applied to the wrong part of the sheet and may result in poor quality. Profile misalignments are monitored by repeatedly performing cross-correlation analysis as new measurement data becomes available. Offset is tracked over time and displayed. Automatic alerts are triggered when the offset deviates from zero and/or changes in value (within certain thresholds).

17 Claims, 4 Drawing Sheets

(58) Field of Classification Search
CPC ........... H04N 1/00095; H04N 1/19594; H04N 1/2141
USPC ........... 73/1.01, 1.13, 1.37, 1.79, 1.81, 1.82, 73/1.89, 37.7, 78, 104, 105, 159, 865.8; 162/198, 263; 427/8, 9, 10, 285, 288, 427/411
See application file for complete search history.

(56) References Cited

U.S. PATENT DOCUMENTS

| | | | |
|---|---|---|---|
| 7,298,492 | B2 | 11/2007 | Tixier |
| 7,695,592 | B2 | 4/2010 | Shakespeare |
| 8,021,517 | B2 | 9/2011 | Hughes |
| 8,527,212 | B2 | 9/2013 | Hughes |
| 9,182,360 | B2 | 11/2015 | Tixier |
| 9,309,625 | B2 | 4/2016 | Backstrom |
| 11,143,495 | B2 | 10/2021 | Hughes |
| 2020/0096308 | A1 | 3/2020 | Huhes |
| 2021/0262776 | A1 | 8/2021 | Tixier |
| 2021/0382173 | A1 | 12/2021 | Hughes |
| 2022/0305516 | A1 | 9/2022 | Lee |

* cited by examiner

AUTOMATED INTERFRAME ALIGNMENT MONITORING FOR SHEET MANUFACTURING APPLICATIONS

REFERENCE TO RELATED APPLICATION

This application claims priority under 35 U.S.C. § 119(e) to application No. 63/522,252 filed Jun. 21, 2023, which is incorporated herein by reference.

FIELD OF THE INVENTION

The present invention generally relates to quality control techniques for fabricating sheet materials and, more particularly, to an automatic monitoring system that determines the level of on-line measurement profile misalignment between scanners which are employed in a continuous sheet production process.

BACKGROUND OF THE INVENTION

On-line measurements are used to detect properties of sheet materials during manufacture to enable prompt control of the sheetmaking processes and, thus, to assure sheet quality while reducing the quantity of substandard sheet material which is produced. One of the main complications in making on-line measurements during sheetmaking is that the physical properties of sheet materials usually vary in the machine direction as well as in the cross direction ("Machine direction" refers to the direction of travel of the sheet material during manufacture, and the term "cross direction" refers to the direction across the surface of a sheet perpendicular to the machine direction.)

To detect variations in sheet materials, scanning sensors are employed that periodically traverse back and forth across a sheetmaking machine in the cross direction while detecting values of a selected sheet property such as basis weight or caliper along each scan. In practice, measurement information provided by scanning sensors is usually assembled after each scan to provide a "profile" of the detected sheet property in the cross direction. In other words, each profile is comprised of a succession of sheet measurements at adjacent locations in the cross direction. The purpose of the profiles is to allow cross-directional variations in sheet properties to be detected easily. The characteristic measurements are averaged in finite sized bins of cross direction segments. Maps displaying the scanner measurements are typically divided into points or bins across the width; for example, each bin can represent a distance of about 5 mm.

In papermaking and lithium-ion battery electrode manufacturing, multiple scanners which are located at different positions along the machine direction are often used. Each scanner generates a cross-machine measurement profile on the production line. The measurement profiles from each scanner may include hundreds of measurements covering discrete areas of the sheet from one side to the other. For measurement and quality control purposes, it is necessary to keep the profiles aligned for all the scanners.

Scanner misalignment also affects the tracing of anomalies from start of the production line through to the end production line. If the sheet being manufactured is coated, misaligned profiles can result in an inaccurate coat weight estimation when the uncoated sheet weight profile is subtracted from the coated weight profile. Currently, sheet manufacturers must manually check the alignment of the scanners by gathering and analyzing appropriate data. Time consuming corrective action is executed where necessary but this can require a high level of domain knowledge and is often only undertaken when a problem is discovered. Moreover, poor sheet quality can persist or go undetected because the manufacturer is unaware that misalignment is the underlying cause. The industry needs an automatic alignment monitoring system that can immediately apprize manufacturers when misalignments occur.

SUMMARY OF THE INVENTION

The present invention is based, in part, on the recognition that designated bins at one scanner device should correspond to the same bins at all other scanner devices; both representing the same discrete part of the sheet. Due to changes in process operations, the alignment of the profiles may change over time so that the profile from one scanner device may align better if the alignment were shifted by a certain number of bins or the corresponding physical distance. Scanner misalignment can lead to problems such as poor cascade controls as downstream control loops act to adjust the wrong part of the target profile for an upstream control loop.

With the present invention, profile misalignments can be monitored by repeatedly performing cross-correlation analysis as new measurement data becomes available. Changes in the offset can be tracked over time and data can be displayed for monitoring. Automatic alerts to plant personnel are triggered when the offset deviates from zero and/or changes in value (within certain thresholds).

In one aspect, the invention is directed to a method of operating a sheet making system that produces a continuous sheet that moves in the machine direction (MD), which includes one or more actuator beams, wherein each beam includes a plurality of actuators arranged along a cross direction, a first sensor which is positioned downstream of the one or more actuator beams at a first position along the MD, and a second sensor which is positioned downstream of the first sensor at a second position along the MD, which includes:

(a) measuring a sheet characteristic of the continuous sheet with the first sensor and generating a first sheet characteristic profile and recording the first sheet characteristic profile in a database (such as in the cloud) of historical first profiles;

(b) measuring a sheet characteristic of the continuous sheet with the second sensor and generating a second sheet characteristic profile;

(c) comparing the second sheet characteristic profile with one or more first profiles from the database to determine alignment information; and (d) repeating steps (a), (b) and (c). The sensors are preferably scanning sensors and the technique employs cross correlation analysis.

In another aspect, the invention is directed to a system of monitoring the formation of a traveling sheet of material, that moves in a machine direction (MD), which includes:

a first device that is configured to measure a first profile of the sheet at a first position;

a second device that is configured to measure a second profile of the sheet at a second position which is downstream from the first position; and means for comparing the first profile to the second profile to determine alignment between the first profile and second profile.

In a further aspect, the invention is directed to a method of operating a sheet making system that produces a continuous sheet that moves in the machine direction (MD), which includes one or more actuators arranged along a cross direction, a first sensor which is positioned downstream of the one or more actuators at a first position along the MD, and a second sensor which is positioned downstream of the first scanning sensor at a second position along the MD, which method includes:

(a) measuring a sheet characteristic of the continuous sheet with the first sensor and generating a first sheet characteristic profile;
(b) measuring a sheet characteristic of the continuous sheet with the second sensor and generating a second sheet characteristic profile; and
(c) comparing the first sheet characteristic profile with the second sheet characteristic profile to determine alignment information.

In one application of the invention, profile data from a sheet manufacturing production line is sent to the cloud where it is stored in a cloud server database for analysis. The data includes profile measurements for many different variables and profile data from at least two scanners. A data monitoring service in the cloud server will periodically, at an appropriate interval such as every hour, collect the most recent data from a common measurement between a pair of scanners. For example, the dry weight profiles from two different scanners may be advantageous for comparison because dry weight is very stable along the machine. Analysis could be based on individual profile; however, averaging a number of profiles may improve subsequent analysis by lessening the impact of random noise. Additional processing will be carried out, such as automatically selecting a portion of the profile away from the edges so that variability in the values near the profile edges does not negatively impact the analysis. Other processing steps may be included. Once the profiles or average profiles have been collected and processed, an alignment analysis is carried out. In a preferred embodiment of this invention, a cross correlation is used with the cross-correlation being calculated for many different offset values between the profiles; offset at which the maximum correlation occurs is then where the profiles best align.

There may be other techniques for determining the alignment such as identifying the locations of the profile edges and using the edge locations to determine alignment. Another technique is to use the sum of absolute errors between the profiles at different offsets. Once the alignment offset has been determined, it can be used in a number of ways. First, offset values over time can be displayed to allow a service technician to see if alignment is correct and stable. Second, a threshold can be determined for how much misalignment is acceptable and at what point misalignment should trigger an alert. The threshold could be in terms of number of bins or physical distance in customer units. If the misalignment for a pair of scanners is detected an operator is informed through an operator display, and optionally the status should be sent via e-mail or text message. The alert will include the amount (degree) of misalignment and the action required to correct alignment and avoid losses due to poor quality.

The automated interframe alignment techniques are particularly suited for sheet manufacturing production of electrodes for lithium-ion batteries, paper, plastic, metal foil, coated metal substrate, or fabric, and the like.

DETAILED DESCRIPTION OF THE PREFERRED EMBODIMENTS

The present invention is directed to methods to determine the alignment between two or more measured profiles that are taken at different locations along a continuous sheet of material. A preferred profile alignment monitoring technique employs cross-correlation. For example, in one application, it is important to know how to align two profiles in sheet manufacturing so that the weight of the coating on the sheet such as an electrode for a lithium-ion battery can be calculated correctly. Coat weight profile is calculated by subtracting the weight of the sheet prior to coating from the measured total weight of the coated sheet after coating. If the profiles are not aligned correctly for this subtraction, the coat weight profile will be inaccurate and corrective control actions for apparent deviations in coat weight may be applied to the wrong part of the sheet; that results in poor quality.

Figure 1:
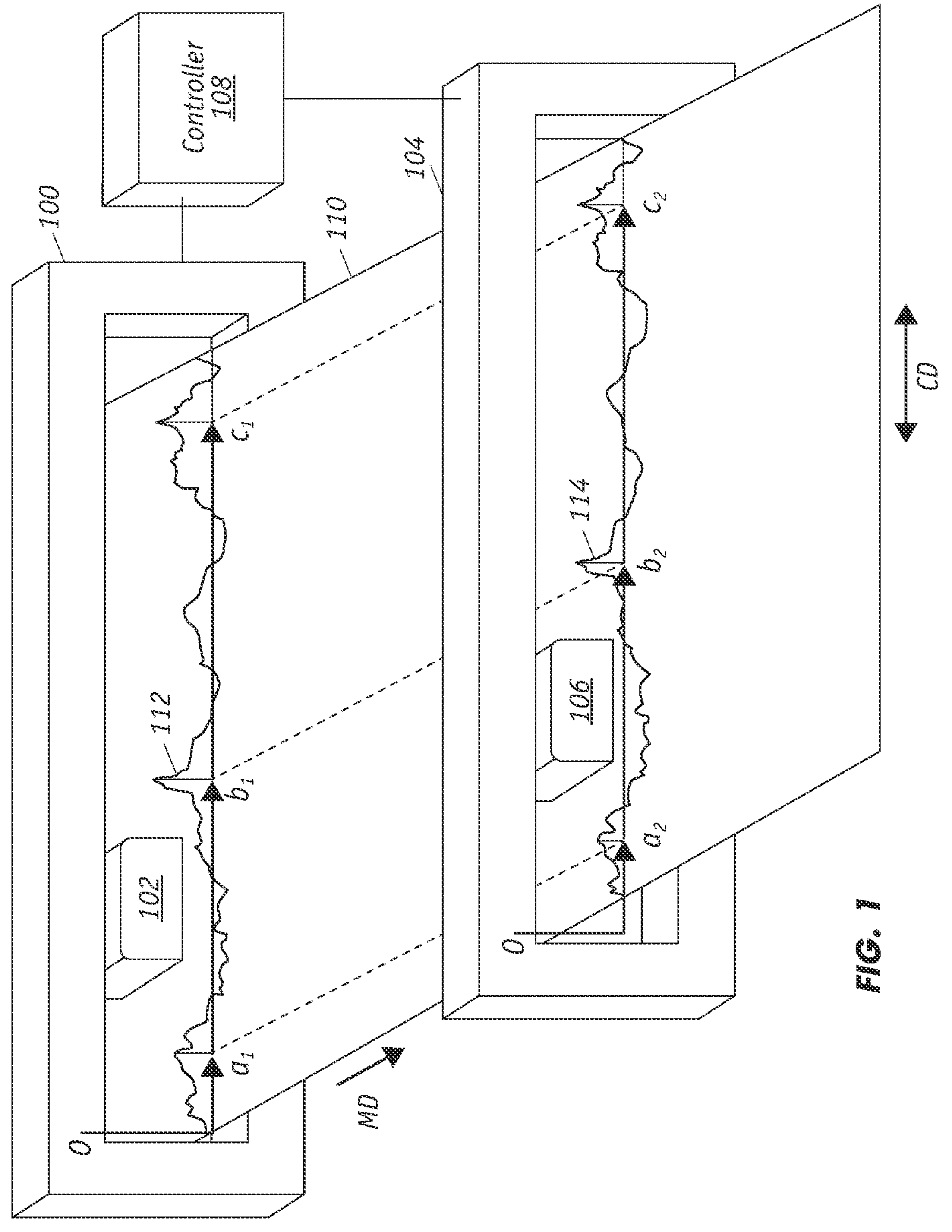
FIG. 1 shows a sheetmaking system with two scanning sensors arranged along the machine direction of the moving sheet.

FIG. 1 shows a pair of scanning sensors 100 and 104 that are positioned along the machine direction (MD) of a sheetmaking process. Scanning sensor 100 includes a scanner head 102 that is supported on a frame comprising two transverse beams and that moves repeatedly back and forth in the cross direction (CD). Similarly, scanner sensor 104 includes a scanner head 106 that is supported on a frame and moves repeatedly back and forth in the CD. The distance along the MD between the two scanning sensors is known and the speed of the moving sheet 110 is known. The first scanning sensor 100 measures a property of the moving sheet 110 at a first location and the second scanning sensor 104 measures the same property of the moving sheet 110 downstream at a second location. A controller 108, which includes a processor and memory, collects data from both sensors. The controller can be coupled to a cloud storage device via a network, for example, the Internet.

Because of the sheet velocity, each scanning sensor travels diagonally across the sheet surface, with the result that consecutive scanning paths have a zig-zag pattern with respect to the direction perpendicular to the longitudinal edges of the sheet. In practice, measurement information provided by a scanning sensor is usually assembled after each scan to provide a "profile" of the detected sheet property in the CD. In other words, each profile is comprised of a succession of sheet measurements at adjacent locations in the cross direction. The characteristic measurements are averaged in finite sized bins of CD segments. The purpose of the profiles is to allow cross-directional variations in sheet properties to be detected easily. Maps displaying the scanner measurements are typically divided into points or bins across the width; for example, each bin can represent a distance of about 5 mm.

In the case where the sheetmaking process produces a continuous sheet of paper product, a paper material, having a specific width, is produced from a pulp suspension feedstock, which comprises of an aqueous mixture of wood fibers and other materials. The feedstock undergoes various unit operations executed by actuators that are monitored and controlled by a quality control system. The actuators include, for example, slices positioned along the width of the headbox that discharge feedstock onto a wire mesh at the wet end of the process, sprayers and heaters which are positioned downstream. Papermaking is described in U.S. Pat. No. 9,309,625 to Backstrom and Forbes and U.S. Pat. No. 8,021,517 to Hughes and Tixier, which are incorporated herein by reference.

In order to control the papermaking process, selected properties of the sheet are continuously measured and the papermaking machine adjusted to ensure sheet quality. Typical physical characteristics of paper that are can be measured include, for example, thickness, basis weight, moisture content, chemical composition such as ash content, surface roughness, gloss, caliper, color, and crepe pattern surface features. CD control may be achieved by measuring sheet properties using one or more scanners that are capable of scanning the sheet. For example, each scanner could carry a plurality of sensors for measuring the dry weight, moisture content, ash content, or any other or additional characteristics.

As shown in FIG. 1, scanning sensor 104 is located downstream from scanning sensor 100. In one configuration, the two scanning sensors measure a characteristic of the paper before and after a particular operation such as heating, calendering, or coating. For example, paper can be coated with a chemical coating or a plastic film. As an illustration, scanning sensor 102 measures a characteristic of the paper, such as its weight, and generates a first profile 112 with three peaks of the weight located at distances $a_1$, $b_1$, and $c_1$, respectively, from an edge of the paper. Thereafter, after a coating is applied to the paper to form a coated paper sheet, scanning sensor 104 measures the basis weight of the coated paper sheet and generates a second profile 114 with three peaks of the basis weight located at distances $a_2$, $b_2$, and $c_2$, respectively, from the edge of the paper. The present invention continuously monitors the alignment of the two profiles.

It is important to align two profiles in continuous sheet manufacturing so that the weight of the coating on the sheet can be calculated correctly. Coat weight profile is calculated by subtracting the weight of the sheet prior to coating from the measured total weight of the coated sheet after coating. If the profiles are not aligned correctly for this subtraction, the coat weight profile will be inaccurate and corrective control actions for apparent deviations in coat weight may be applied to the wrong part of the sheet and result in poor quality.

With the present invention, alignment analysis is performed repeatedly as new measurement data becomes available to permit tracking of the changes in offset over time. The results can be displayed for monitoring; automatic alerts can be transmitted when the offset deviates from zero and/or changes in value (within certain thresholds).

Figure 2:
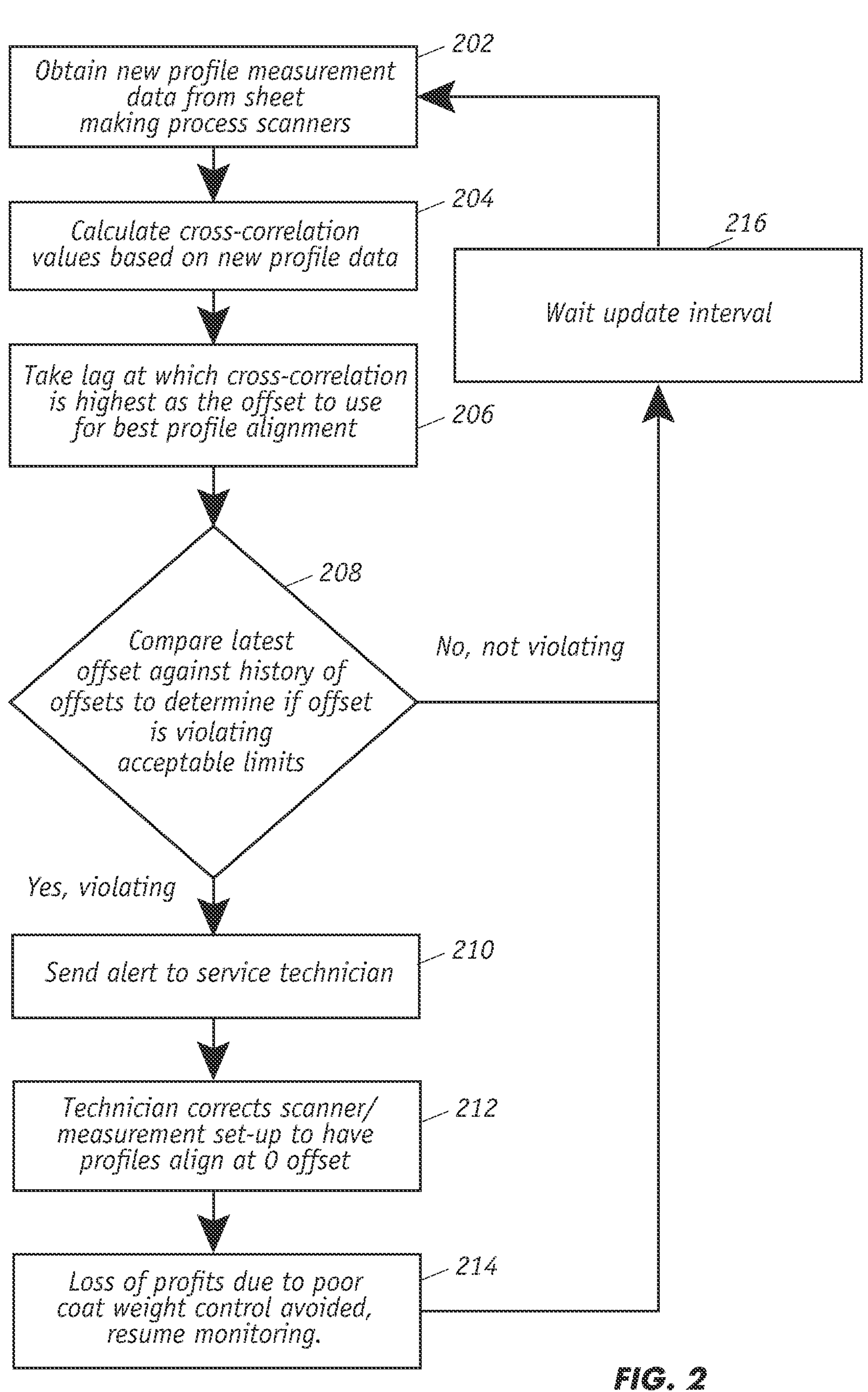
FIG. 2 is a flow chart of the profile alignment monitoring technique.

FIG. 2 is a flow chart describing an approach to determine the alignment between the two measured profiles taken at different locations along a sheet of material. In initial steps 202, 204 and 206, cross-correlation values are calculated for a new profile measurement. The lag at which cross-correlation is highest is selected as the offset to be used for the profile alignment. Next in step 208, the latest offset is compared against the history offsets to determine if the offset is violating acceptable limits. If there is no violation, the process is repeated following for another profile following an update interval 216. However, if a violation is detected, in steps 210 and 212 an alert can be sent to plant personnel and a technician takes corrective actions such as correcting the scanner/measurement set-up to have profiles align at 0 offset. Thereafter, monitoring is resumed in step 214.

As an illustration of the inventive process, consider a profile $y_1$ which is measured by a first scanning sensor and a profile $y_2$ which is measured by a second scanning sensor which is located downstream of the first scanning sensor. Each scanning sensor measures the same width, which typically extends beyond both edges of the sheet. Due to movement of the sheet as it travels along the process, material located at a certain position on the first scanning sensor may not be located at the same position on the second scanning sensor. It is important to determine the difference in positions between locations. For these measurements, it is assumed that sheet properties are measured at N positions across the length of the sheet and, for simplicity of explanation, it is also assumed that the same number of measurements are made at both locations. It is understood that this technique can be readily extended to handle cases where the number of measurements is different between measurement locations.

A cross-correlation function gives a measure of how much two signals move together as a function of displacement of one relative to the other. Cross-correlation will be used to determine how to best align the two measurement profiles.

The cross-covariance function for two profiles, $y_1$ and $y_2$, is:

$$R_{y_1 y_2}(m) = \begin{cases} \frac{1}{N-m} \sum_{n=1}^{N-m} y_1(n+m) y_2(n) & m \geq 0 \\ \frac{1}{N+m} \sum_{n=1}^{N+m} y_2(n-m) y_1(n) & m < 0 \end{cases}$$

The cross-correlation function is the cross-covariance normalized by the zero-lag auto-covariances $$r_{y_1 y_2}(m) = \frac{R_{y_1 y_2}(m)}{\sqrt{R_{y_1 y_1}(0) R_{y_2 y_2}(0)}}$$

For the above equations, $y_1$ and $y_2$ are the measured profiles of paper (or other type of sheet) properties, such as dry weight. $R\{y_1,y_2\}$ is the cross-covariance function between $y_1$ and $y_2$ indicting how much the values of the two profiles move together across the width of the paper machine (or other sheet manufacturing apparatus). m is the positional offset between the two profiles. N is the number of data points (in this case the number of bins in the profile) used in the analysis. $r\{y_1,y_2\}$ is the cross-correlation, which is the cross-covariance normalized by the zero-lag autocovariances of the two variables $y_1$ and $y_2$.

The cross-correlation gives a maximum value of 1 when the profiles vary together exactly. The cross-covariance function for the two profiles is calculated to find the lag at which the cross-correlation is highest to be the offset needed to best align the profiles. The value m at which r is highest is the offset needed to best align the profiles.

In many cases the edges of the sheet are not located at the same locations on each scanner. Also, there can be unexpected and variable behavior of sheet properties near the edges. For these reasons it is better to avoid using the edge part of the profiles when determining how to best align profiles. The edge portions of the sheet are not included in the cross-correlation calculations. For a given system, there can be user entered values (start and end positions) to determine what parts of the profile to use for the alignment calculation. For illustrative purposes, safe initial/default values of starting at 20% of the sheet width and ending at 80% of the sheet width will be used unless the user overrides these values.

Figures 3A, 3B:
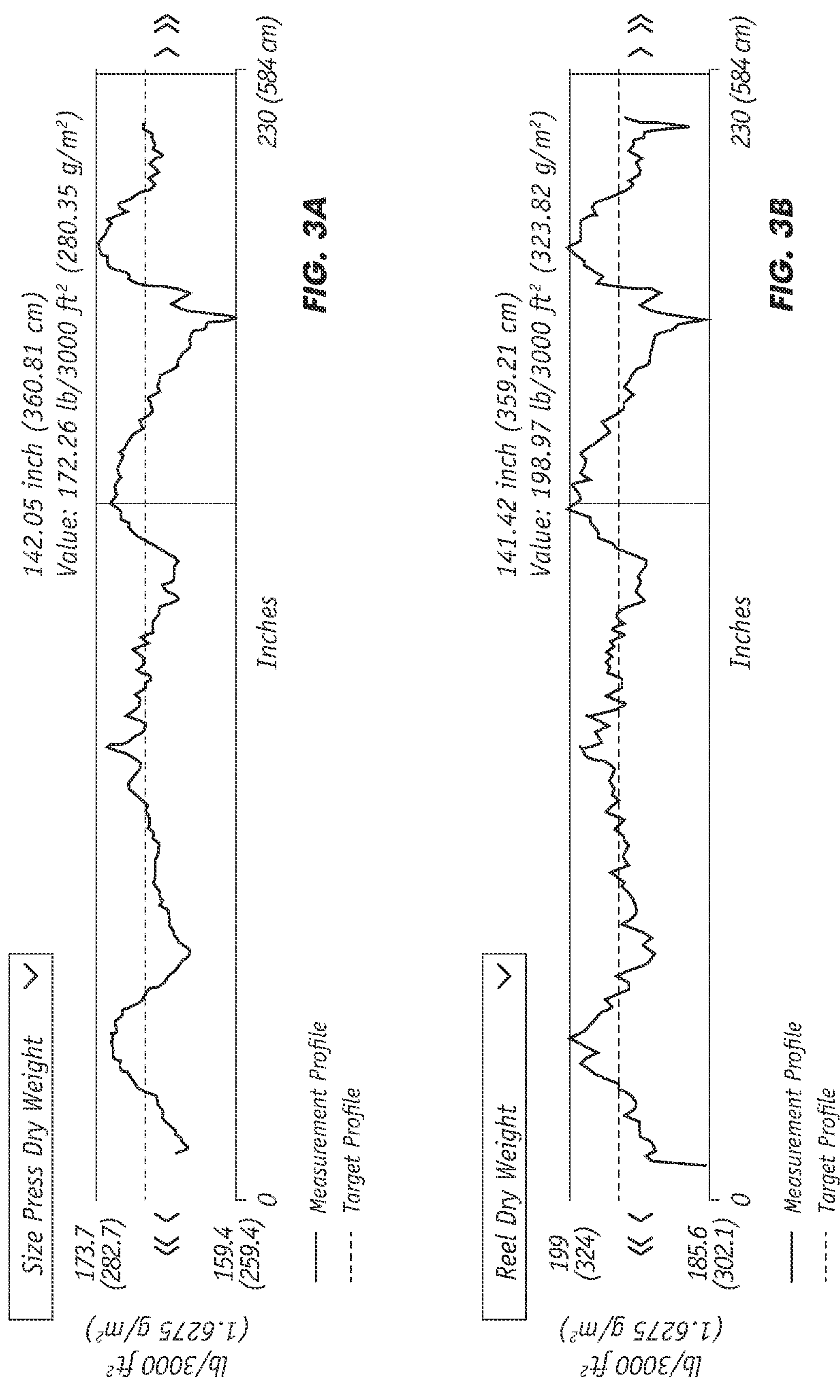
FIGS. 3A and 3B are dry weight profiles from two scanners that are not perfectly aligned.

FIGS. 3A and 3B are examples of two measured profiles that were taken in a papermaking machine. The dry weight of the paper product was measured prior to the size press, which is located part way through the paper making process. The size press applied a solution of starch material onto the surface of the dry paper. The dry weight of the finished paper was then measured at the take up reel where the continuous paper was wound. The weights were measured with beta gauge scanning sensors operating in the transmissive mode.

FIG. 3A shows the measured profile of the paper weight (the weight of the paper at locations across the width of the paper machine) as measured by the size press scanner (midway through the papermaking machine). FIG. 3B shows the weight of the profile of the paper weight (the weight of the paper at locations across the width of the paper machine) as measured by the reel scanner (towards the end of the papermaking machine). If the paper does not shrink or wander with respect to the machine cross direction as it moves along the papermaking machine, the edges of the profile and the peaks and valleys of the profiles should be in the same location on the x-axis of each plot. The scanner alignment analysis invention determines whether the profiles are indeed positioned in the same location across the x-axis or by how much one profile shifts in the machine cross-direction.

As shown in FIG. 3A, the measurement profile along the width of the paper fluctuated above and below the target profile. Similar, in FIG. 3B, the measurement profile of the coated paper also fluctuated around the target profile for the coated paper. Both measured profiles have the same basic shape, but the peaks in the profiles do not align at exactly the same location (as can been seen by the peak at 142.05 inches (360.81 cm) in the size press measurement and the same peak in the reel measurement at 141.42 inches (359.21 cm). Furthermore, the two profiles do not begin and end at the same locations and the behaviors of the two profiles near the edges are quite different. In this case, the algorithm focuses on the inner portion of the profiles (by default the inner 60%, from 46 inches (117 cm) to 184 inches (467 cm) in this case).

Figures 4A, 4B:
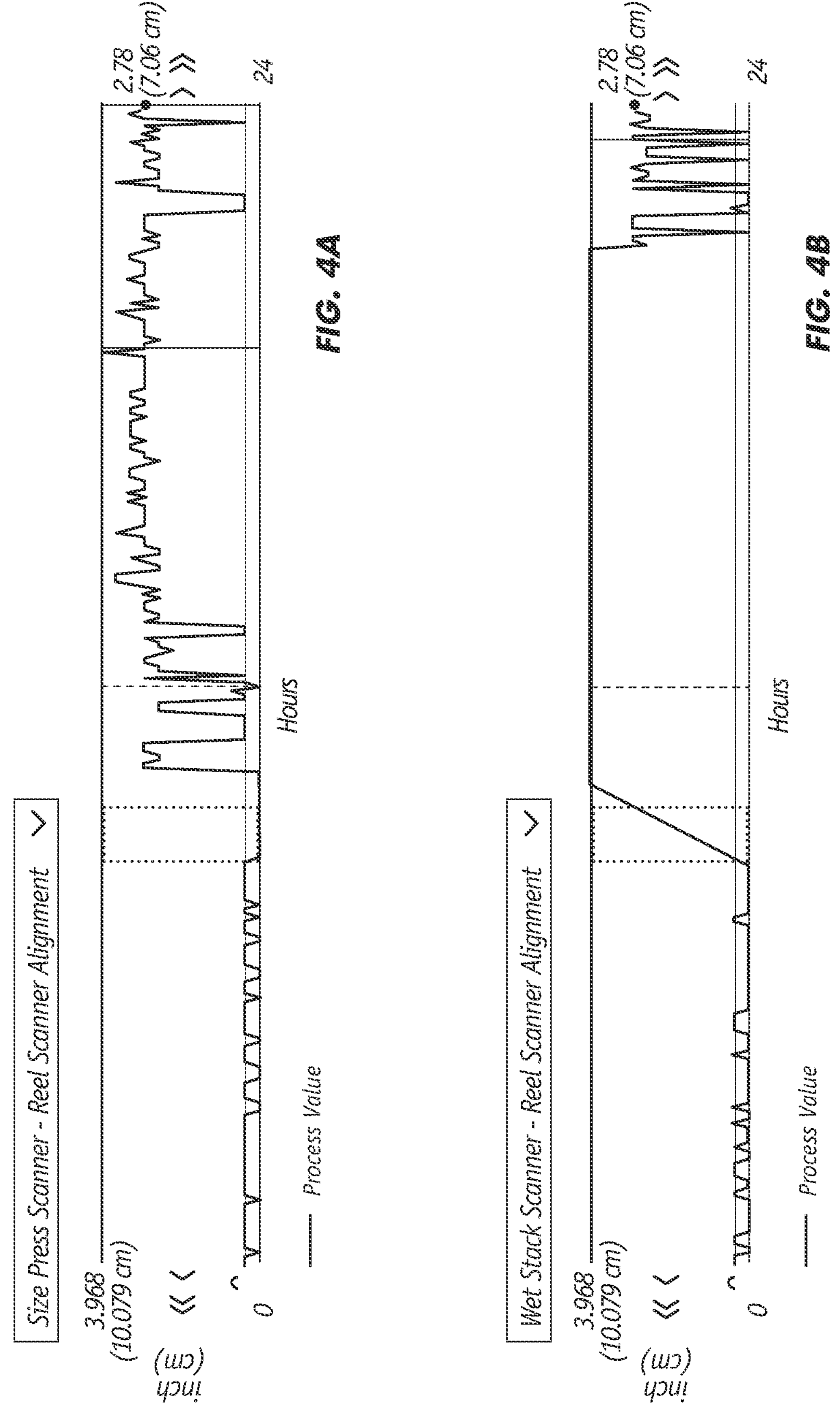
FIG. 4A shows the calculated weight alignment offset over a 24-hour period between a size press scanner and a reel scanner.
FIG. 4B shows the calculated weight alignment offset over a 24-hour period between a wet stock scanner and a reel scanner.

FIGS. 4A and 4B give the alignment analysis between pairs of profiles over a 24-hour period. FIG. 4A compares the measured profile at the size press scanner with the measured profile at the reel scanner. Plotted are the profile offsets that are calculated by the method described above. FIG. 4B compares the positioning of profiles measured at the wet stock scanner with those measured at the reel scanner. The wet stock scanner is located after the wet end of a papermaking machine where the pulp slurry, which is a mixture of fiber and water, is dewatered. Both the plots (FIGS. 4A and 4B) show that initially the profiles were well-aligned with offset near 0 for approximately the first 10 hours of the time period shown. However, in the second half of the time period the sheet appears to shirt position between scanners because the plots show a persistent offset between profiles of 2.78 inches. The dashed vertical line midway across the plots indicates where a grade change occurred (the paper machine operations switched to making a different specification of paper). The box shown by the dotted lines indicates where there was a sheet break (and no data was available).

With the present invention, a number of profiles at each location can be averaged for a period of time and then the cross-correlation calculations are performed to determine the offset between the profiles. By repeating this process at fixed time intervals, a trend of the offset over time can be developed. For best product quality, the offset should remain near zero. By observing the trends over time, thresholds for deviation from zero can be determined. Then alerts can be generated when the offset is beyond threshold for a period of time.

While the invention has been illustrated in a papermaking process, it is understood that it can be applied to other sheetmaking processing including, for example, plastic, fabrics, metal foils, and coated metal foils such as electrodes for lithium-ion batteries.

Instead of employing a scanning sensor, one or a plurality of stationary sensors can be used. For example, a plurality of sensors can be strategically positioned along the width of the sheet 110 (FIG. 1). Each static sensor provides only fixed-point measurements. Multiple stationary sensors would be needed to cover the entire sheet in the CD.

Depending on the properties being monitored, the scanning sensors can be configured to operate in the transmissive mode or reflective mode. For instance, an upper scanner head can house a radiation source that directs a beam of radiation into a moving web or sheet and a lower scanner head houses a radiation receiver that detects radiation that is transmitted through the material. As the dual scanner heads advance back and forth along the CD, the sensor measures one or more properties of the web or sheet. Sensors operating in the transmission mode are described, for instance, in U.S. Pat. No. 9,182,360 to Tixier and Hughes, U.S. Pat. No. 8,527,212 to Hughes and Tixier, U.S. Pat. No. 7,298,492 to Tixier, US 2021/0382173 to Hughes et al. and US 2021/0262776 to Tixier and Hughes, which are incorporated herein by reference. Typically, in the normal production mode, the sampling rate of the scanning sensor ranges from one sample every 10 to 200 milliseconds.

In the reflective mode, an upper scanner head can house both a radiation source and detector to measure one or more characteristics of the web or sheet. Sensors operating in the reflective mode are described, for instance, in in U.S. Pat. Nos. 9,182,360, 8,527,212, 7,298,492 and US2020/0096308 to Hughes et al., which are incorporated herein by reference.

Cameras can be secured to the upper or lower scanner head to capture surface images of the sheet 60. Camera systems are described in U.S. Pat. No. 7,695,592 to Shakespeare and Kellomaki, which is incorporated herein by reference.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of operating a sheet making system that produces a continuous sheet that moves in a machine direction (MD), which includes one or more actuator beams, wherein each beam includes a plurality of actuators arranged along a cross direction, a first sensor which is positioned downstream of the one or more actuator beams at a first position along the MD, and a second sensor which is positioned downstream of the first sensor at a second position along the MD, the method comprising:

(a) measuring a sheet characteristic of the continuous sheet with the first sensor and generating a first sheet characteristic profile and recording the first sheet characteristic profile in a database of historical first profiles;

(b) measuring a sheet characteristic of the continuous sheet with the second sensor and generating a second sheet characteristic profile;

(c) comparing the second sheet characteristic profile with one or more first sheet characteristic profiles from the database to determine one or more offset values between the first and second sheet characteristic profiles;

(d) comparing the one or more offset values with previous offset values to determine if the one or more offset values exceed a threshold value, wherein the previous offset values are determined based on historical first sheet characteristic profiles and historical second sheet characteristic profiles;

(e) sending an alert to a user based on the one or more offset values exceeding the threshold value; and (f) repeating steps (a), (b), (c), (d), and (e).

2. The method of claim 1 wherein the first sensor comprises a first scanning sensor and the second sensor is a second scanning sensor.

3. The method of claim 1 wherein the one or more offset values determined in step (c) are collected over time and the offset data is displayed.

4. The method of claim 1 wherein the one or more offset values determined in step (c) are collected and an automatic alert is triggered when the offset exceeds the threshold value.

5. The method of claim 1 wherein the sheet characteristic is the weight of the continuous sheet.

6. The method of claim 1 wherein the continuous sheet comprises paper, plastic, metal foil, coated metal substrate or fabric.

7. A system of monitoring the formation of a traveling sheet of material, that moves in a machine direction (MD), which comprises:

a first device that is configured to measure a first profile of the sheet at a first position;

a second device that is configured to measure a second profile of the sheet at a second position which is downstream from the first position; and a processor configured to compare the first profile to the second profile using cross-correlation analysis to determine alignment between the first profile and second profile.

8. The system of claim 7, wherein the processor is further configured to determine an offset value between the first profile and the second profile.

9. The system of claim 7 wherein the first device is a first scanning sensor that traverses back and forth along a cross direction (CD) across the traveling sheet at a first position and the second device is a second scanning sensor that traverses back and forth along a CD across the traveling sheet at a second position.

10. The system of claim 7 wherein the system is a sheet making system having one or more actuators that is arranged in a cross direction.

11. The system of claim 7 wherein the system produces paper, plastic, metal foil, coated metal substrate or fabric.

12. The system of claim 7, further comprising a memory configured to store the first profile.

13. The system of claim 7 wherein the first device measures the weight of the sheet of material at the first position and the second device measures the weight of the sheet of material at the second position.

14. A method of operating a sheet making system that produces a continuous sheet that moves in the machine direction (MD), which includes one or more actuators arranged along a cross direction, a first sensor which is positioned downstream of the one or more actuators at a first position along the MD, and a second sensor which is positioned downstream of the first scanning sensor at a second position along the MD, which comprises:

(a) measuring a sheet characteristic of the continuous sheet with the first sensor and generating a first sheet characteristic profile;

(b) measuring a sheet characteristic of the continuous sheet with the second sensor and generating a second sheet characteristic profile; and (c) comparing the first sheet characteristic profile with the second sheet characteristic profile using cross-correlation to determine alignment information.

15. The method of claim 14 comprising (d) determining an offset value between the first sheet characteristic profile and the second sheet characteristic profile.

16. The method of claim 14 wherein the sheet characteristic is the weight of the continuous sheet.

17. The method of claim 14 wherein the continuous sheet comprises paper, plastic, metal foil, coated metal substrate or fabric.

* * * * *